3,284,649
SYNCHRONOUS ELECTRIC MOTOR WITH AN INERTIA FLYWHEEL AND A UNIDIRECTIONAL STARTER
Boris Victorien Barlow, Edgware, Middlesex, England, assignor to S. Smith & Sons (England) Limited, London, England, a British company
Filed Sept. 21, 1964, Ser. No. 397,753
4 Claims. (Cl. 310—41)

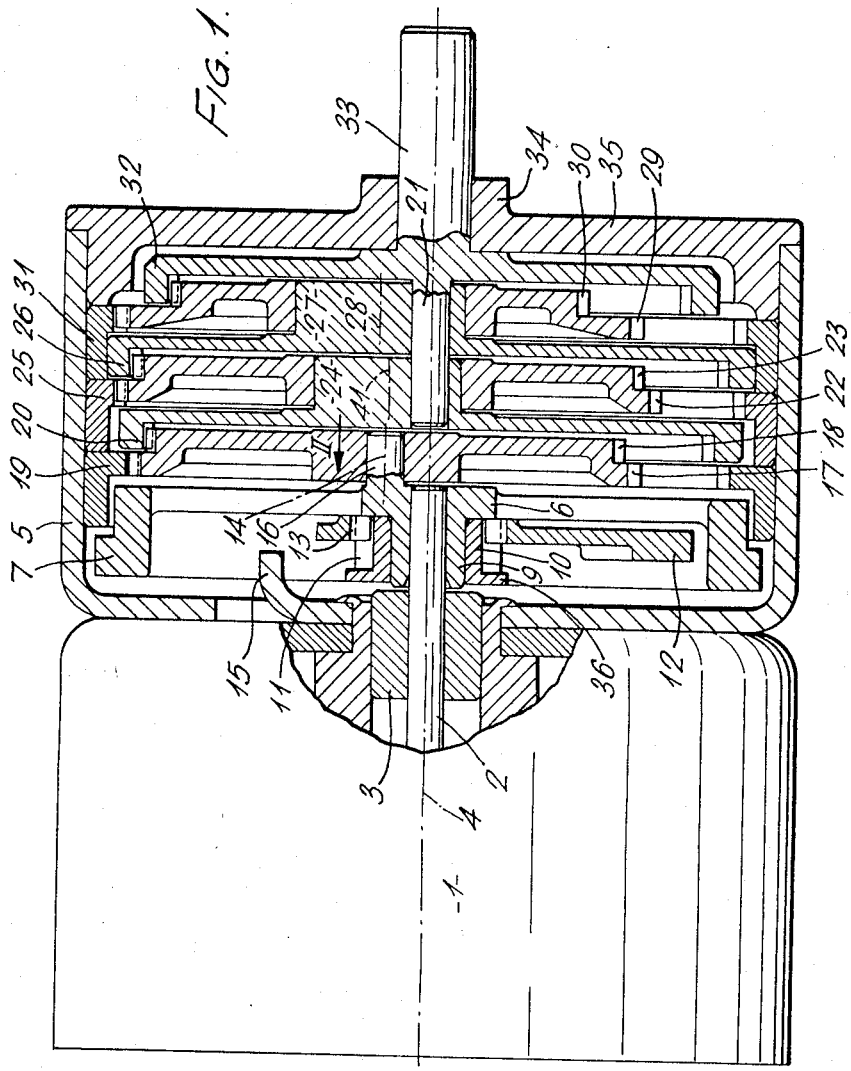

This invention relates to synchronous electric motors.

Synchronous electric motors, when energized, sometimes apply a torque to the rotor which is insufficient to start it rotating. If the rotor does not start rotating, an alternating torque is applied to the rotor which then vibrates. It is known that in order to assist the initiation of rotation, a flywheel may be coupled to the rotor through a hairspring. The flywheel vibrates when the rotor vibrates and the amplitude of its vibrations, and therefore those of the rotor, increases until the rotor begins to rotate.

It is an object of this invention to provide a synchronous electric motor comprising means to assist the initiation of rotation of the rotor when the motor is first energized.

According to this invention there is provided a synchronous electric motor comprising an annular member coupled to the rotor through thin spokes, the annular member and the spokes being integrally formed from a resilient material.

If the rotor vibrates when the motor is energized, the vibrations are transmitted to the annular member through the spokes. The amplitude of the vibrations of the annular member builds up since the spokes are resilient and act as springs. The amplitude of the rotor vibrations similarly increases until the rotor begins to rotate.

Preferably the synchronous electric motor also comprises a hub fixed to a spindle forming part of or driven by, the rotor, the annular member being arranged to surround the hub and being attached to it by the spokes. The hub, the annular member and the spokes are integrally formed.

If the synchronous electric motor comprises means for ensuring that the rotor rotates in a desired direction of rotation, the means may comprise helical splines formed on the hub or a member carried by the hub, a weight mounted on the hub or member and formed with co-operating helical grooves, and first and second stop members disposed so as to limit the axial motion of the weight between first and second extreme axial positions. A third stop member is disposed so that the weight collides with it when said weight rotates in its first extreme axial position. The arrangement is such that when the rotor rotates in the desired direction, the weight is driven to its second extreme axial position and rotates there, but when the rotor rotates in the undesired direction, the weight is driven to its first extreme axial position, rotates there and collides with the third stop member. The impulse generated by the collision serves to reverse the direction of rotation of the rotor.

A synchronous electric motor constructed in accordance with this invention will now be described with reference to the accompanying drawings in which:

FIGURE 1 is a side elevation, partly in section, of a timing mechanism incorporating the synchronous electric motor;

Figure 1A:
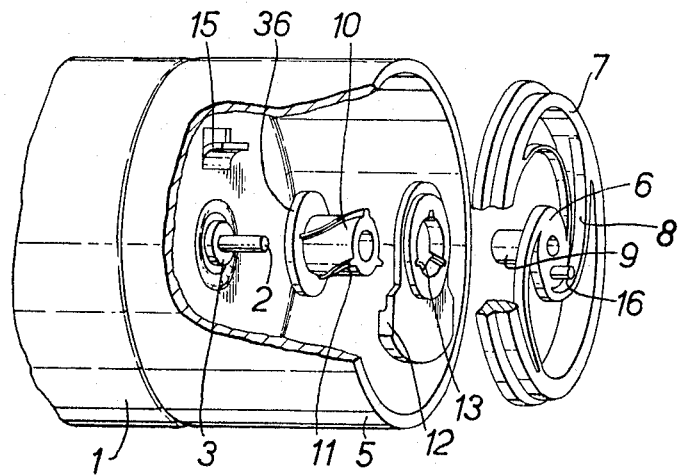
FIGURE 1A is an exploded view of a portion of the mechanism shown in FIGURE 1.

A single phase synchronous alternating current motor 1 drives a spindle 2 which is rotatable within a bush 3 about an axis 4. The motor 1 has a wound stator with fifteen pairs of poles and a permanent magnet rotor with fifteen pairs of poles and can drive the spindle 2 in either direction. A motor of this general type is shown in British Patent No. 934,956. The base of a cup-shaped casing 5 is fixed to the motor 1 so that its cylindrical wall is coaxial with the spindle 2 which protrudes through a hole in the base. Referring now to both FIGURES 1 and 2, the hub 6 of a flywheel is force-fitted onto the spindle 2 and is connected to the rim 7 of the flywheel by arcuate spokes 8. The hub 6, rim 7, spokes 8, and a sleeve 9 which extends from hub 6 and surrounds spindle 2, are moulded integrally from a resilient plastics material. A collar 10 which has three helical splines 11 and a radial extending flange 36 is force-fitted onto the sleeve 9 and carries a weight 12 which has three mating helical grooves 13. The weight 12 is not balanced about the axis 4 and is shown in the drawings with its center of gravity below the axis 4. A lug 15 projects from the base of the casing 5 into the space enclosed by rim 7. The length and disposition of lug 15 is such that if the weight 12 is rotated at a position abutting the hub 6, weight 12 does not collide with lug 15. However, if weight 12 is rotated at a position abutting the flange 36, weight 12 does collide with said lug 15.

The hub 6 carries an integrally moulded crank-pin 16 which lies on an axis 14 and on which a unitary cluster of two gears 17 and 18 is mounted for rotation about the axis 14. The gear 17 has the larger diameter, and meshes with an internal gear 19 which is force-fitted into casing 5. The gear 18 engages an internal ring gear 20 which is rotatably mounted on a spindle 21 lying on the axis 4, and has an eccentric hub 24 having an axis 41. A cluster of two gears 22 and 23 is rotatably mounted on the hub 24 so that it can rotate about the axis 41. The gear 22 has the larger diameter, and engages an internal ring gear 25 which is force-fitted into casing 5. The gear 23 engages an internal ring gear 26 which is rotatably mounted on the spindle 21, and has an eccentric hub 27 having an axis 28. A cluster of two gears 29 and 30 is rotatably mounted on the hub 27 so that it can rotate about the axis 28. The gear 29 has the larger diameter, and engages an internal ring gear 31 which is force-fitted into the casing 5. The gear 30 engages an internal ring gear 32 which is integrally formed with the spindle 21 and a shaft 33. The shaft 33 is rotatably mounted in a bearing 34 formed in an end plate 35 fixed to the casing 5. All the gears, the collar 10, the weight 12 and the end plate 35 are moulded from a plastics material.

Figure 2:
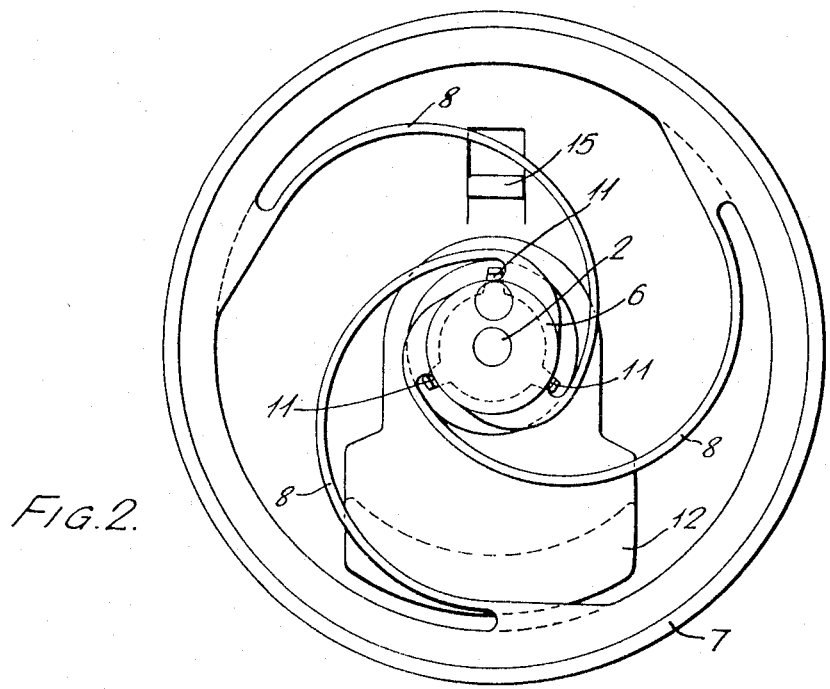
FIGURE 2 is a view of components of the mechanism from the direction of the arrow II in FIGURE 1.

The epicyclic gearing arrangement 17–32 shown in FIGURE 1, does not in itself comprise a portion of the present invention. As is well-known, however, such a gear train has sufficient backlash to permit vibrations of crank pin 16, even though output shaft 33 is stationary.

The operation of the timing device will now be described. The stator windings of the motor 1 are energized from a suitable A.C. source. When the windings are first energized, the torque applied to the rotor is normally insufficient to start it rotating. An alternating torque is applied to the rotor which therefore vibrates, and these vibrations are transmitted to the spindle 2 and to the rim 7 of the flywheel through the spokes 8. The spokes 8 which are resilient act as springs, the stiffnesses of which are such that the amplitude of the vibrations of the rim 7, and therefore those of the rotor, build up. The amplitude of the vibrations increases until they exceed 6°, at which point the rotor invariably begins to rotate. If the rotor, and therefore the spindle 2, begin to rotate in the clockwise direction (as seen from the direction of the arrow II) the weight 12 is driven toward and against the hub 6, as a result of its out of balance condition and the action of the helical splines 11. When the weight 12 is resting against the hub 6, weight 12 rotates with the spindle 2, but does not collide with the lug 15; and, as a result, the spindle 2 is permitted to continue rotating in the clockwise direction. If, however, the rotor, and therefore the spindle 2, begin to rotate in the anticlockwise direction, the weight 12 is translated axially along collar 10 toward the flange 36 as a result of its out of balance condition and the action of the helical splines 11 cooperating with the helical grooves 13. When the weight 12 is resting against the flange 36, it rotates with the spindle 2 and collides with the lug 15. The impulse generated by the collision is sufficient to reverse the direction of rotation of the rotor and to start the rotor rotating in the clockwise direction. As a result, the weight 12 moves away from lug 15 and no longer collides with the lug 15 as has been explained, and the motor continues to rotate in the correct direction.

If the stator is energized from an A.C. supply at 50 c./s., the rotor rotates at 200 r.p.m. in the clockwise direction. The crank-pin 16 is similarly rotated about the axis 4, and the cluster of gears 17 and 18 is rotated about the axis 14 in the anticlockwise direction. The gear 20 is rotated in the clockwise direction about the spindle 21 so that the axis 41 rotates about the axis 4. The cluster of gears 22 and 23 on the hub 24 rotates in the anticlockwise direction about the axis 41. The gear 26 is rotated in the clockwise direction about the spindle 21 so that the axis 28 rotates about the axis 4. The cluster of gears 29 and 30 on the hub 27 rotates in the anticlockwise direction about the axis 28. The gear 32 and the spindle 33 are rotated at 1 revolution per day in the clockwise direction about the axis 4. The spindle 33 may carry contact levers which may be arranged to operate electrical contacts at set times of the day.

The timing mechanism described operates satisfactorily if the axis 4 is horizontal, but if the axis 4 is vertical its operation is unsatisfactory. When the rotor is stationary in this attitude of the timing mechanism, the weight 12 rests against the hub 6 so that when the motor 1 is energized the gravitational force on the weight 12 holds it against the hub 6 regardless of the direction of rotation of the spindle 2. It will be appreciated that when the axis 4 is vertical, the out of balance condition of the weight 12 does not assist in directional control. If the spindle 2 is rotating in the anticlockwise direction the weight 12 does not collide with the lug 15, and the rotor 12 continues to rotate in the wrong direction. In a modification, the weight 12 is replaced by a disc having similar helical grooves 13. The rotary movement of the disc is permanently impeded by the application of a friction brake so designed as to absorb a minimum of torque when the disc is rotating simultaneously with and abutting against hub 6. The axial position of the disc is determined by its direction of rotation regardless of the attitude of the timing mechanism. The disc carries an arm arranged to collide with the lug 15 when said disc rotates in a position resting against the flange 36.

I claim:
1. A synchronous electric motor including a rotor, means for ensuring that said rotor rotates in a desired direction comprising a rotatable member arranged to be driven by said motor and formed with helical splines, a weight rotatable with said rotatable member and mounted for axial movement along said rotatable member, said weight being formed with helical grooves cooperating with said splines to effect said axial motion of said weight upon rotation of said rotatable member, first and second stop members disposed so as to limit the motion of said weight along the axis of said rotatable member between first and second extreme axial positions, and a third stop member disposed so that said weight collides with said third stop member when said weight rotates in its first extreme axial position, the arrangement being such that when said rotor rotates in the correct direction, said weight is driven to its second extreme axial position and rotates there, and when said rotor rotates in the incorrect direction, said weight is driven to its first extreme axial position, rotates there and collides with said third stop member, the impulse generated by the collision serving to reverse the direction of rotation of said rotor.

2. A synchronous electric motor as claimed in claim 1 wherein said weight is unbalanced about said rotatable member and has a relatively small inertia.

3. A synchronous electric motor having a rotor, a spindle driven by said rotor, and means for assisting the initiation of rotation of said rotor comprising a hub fixed to said spindle, an annular member disposed in surrounding relation to said hub, and a plurality of thin spokes extending between said annular member and said hub for coupling said annular member to said rotor, said annular member, said spokes, and said hub being integrally formed of a resilient material.

4. A synchronous electric motor as claimed in claim 3 wherein said thin spokes are curved so that as they extend towards said annular member they also extend in a direction opposite to the normal direction of rotation of the annular member.

No references cited.

MILTON O. HIRSHFIELD, *Primary Examiner.*

J. W. GIBBS, *Assistant Examiner.*